United States Patent
Rodriguez (10) Patent No.: US 11,083,061 B1
(45) Date of Patent: Aug. 3, 2021

(54) SYSTEMS TO CONTROL LIGHT OUTPUT CHARACTERISTICS OF A LIGHTING DEVICE

(71) Applicant: ABL IP Holding LLC, Atlanta, GA (US)

(72) Inventor: Yan Rodriguez, Suwanee, GA (US)

(73) Assignee: ABL IP HOLDING LLC, Atlanta, GA (US)

( * ) Notice: Subject to any disclaimer, the term of this patent is extended or adjusted under 35 U.S.C. 154(b) by 0 days.

(21) Appl. No.: 17/072,264

(22) Filed: Oct. 16, 2020

(51) Int. Cl.
*H05B 45/10* (2020.01)
*H05B 45/20* (2020.01)
*H05B 47/165* (2020.01)
*H05B 45/46* (2020.01)
*H05B 47/185* (2020.01)

(52) U.S. Cl.
CPC ............. *H05B 45/20* (2020.01); *H05B 45/10* (2020.01); *H05B 45/46* (2020.01); *H05B 47/165* (2020.01); *H05B 47/185* (2020.01)

(58) Field of Classification Search
CPC ........ H05B 45/00; H05B 45/10; H05B 45/20; H05B 45/30; H05B 45/345; H05B 45/3577; H05B 45/46; H05B 47/10; H05B 47/11; H05B 47/17; H05B 47/105; H05B 47/115;
(Continued)

(56) References Cited

U.S. PATENT DOCUMENTS 6,201,351 B1  3/2001  Rudolph et al.
6,323,598 B1  11/2001  Guthrie et al.
(Continued)

FOREIGN PATENT DOCUMENTS

CN  106555981  4/2017
EP  2768283  8/2014
(Continued)

OTHER PUBLICATIONS

"2×4 LED Flat Panel", Cybertech, Main Place Lighting, Available Online at: https://shopmainplacelighting.com/collections/commercial-lighting/products/2-x-4-led-flat-panel-1, Accessed from Internet on May 14, 2019, 3 pages.
"3 Inch WarmDim/Tunable White", Aculux, Accessed from Internet on May 15, 2020, 3 pages.
(Continued)

*Primary Examiner* — Haissa Philogene
(74) *Attorney, Agent, or Firm* — Kilpatrick Townsend & Stockton LLP (57) ABSTRACT

Certain aspects involve lighting systems relating to control of light fixture output intensity and color temperature. For instance, an input device of the lighting system includes a first selector element communicatively coupled to a driver of a light-emitting diode lighting device across a power cable. The power cable provides a transmission path of power and a control signal between the input device and the driver of the light-emitting diode lighting device. The first selector element is able to control a lumen output of the light-emitting diode lighting device when in a lumen control mode and to control a correlated color temperature output of the light-emitting diode lighting device when in a correlated color temperature control mode. The input device also includes a second selector element that transitions the first selector element between the lumen control mode and the correlated color temperature control mode.

20 Claims, 5 Drawing Sheets

(58) Field of Classification Search
CPC .... F21V 23/001; F21V 23/04; F21Y 2115/10; F21Y 2113/13; Y02B 20/30; Y02B 20/40
See application file for complete search history.

(56) References Cited

U.S. PATENT DOCUMENTS

| | | | |
|---|---|---|---|
| 6,995,355 B2 | 2/2006 | Rains, Jr. et al. | |
| 7,014,336 B1 | 3/2006 | Ducharme et al. | |
| 7,088,059 B2 | 8/2006 | McKinney et al. | |
| 7,135,664 B2 | 11/2006 | Vornsand et al. | |
| 7,173,383 B2 | 2/2007 | Vornsand et al. | |
| 7,329,998 B2 | 2/2008 | Jungwirth | |
| 7,416,312 B1 | 8/2008 | McDermott | |
| 7,423,387 B2 | 9/2008 | Robinson et al. | |
| 7,497,590 B2 | 3/2009 | Rains, Jr. et al. | |
| 7,520,634 B2 | 4/2009 | Ducharme et al. | |
| 7,883,239 B2 | 2/2011 | Rains, Jr. et al. | |
| 8,172,415 B2 | 5/2012 | Wegh et al. | |
| 8,203,260 B2 | 6/2012 | Li et al. | |
| 8,228,002 B2 | 7/2012 | Newman, Jr. et al. | |
| RE43,606 E | 8/2012 | Bruwer | |
| 8,317,362 B2 | 11/2012 | Ku et al. | |
| 8,373,362 B2 | 2/2013 | Chemel et al. | |
| 8,436,549 B2 | 5/2013 | Hasnain | |
| 8,598,809 B2 | 12/2013 | Negley et al. | |
| 8,633,650 B2 | 1/2014 | Sauerlaender | |
| 8,638,045 B2 | 1/2014 | Kunst et al. | |
| 8,669,722 B2 | 3/2014 | Yeh et al. | |
| 8,710,754 B2 | 4/2014 | Baddela et al. | |
| 8,791,642 B2 | 7/2014 | van de Ven et al. | |
| 8,823,289 B2 | 9/2014 | Linz et al. | |
| 8,872,438 B2 | 10/2014 | Zhou et al. | |
| 8,878,443 B2 | 11/2014 | Luo et al. | |
| 8,890,419 B2 | 11/2014 | Stack | |
| 8,890,436 B2 | 11/2014 | Chou | |
| 8,914,312 B2 | 12/2014 | McLaughlin et al. | |
| 8,928,249 B2 * | 1/2015 | Raj | H05B 45/22 315/291 |
| 8,941,312 B2 | 1/2015 | McRae | |
| 8,975,823 B2 | 3/2015 | Yang et al. | |
| 9,055,647 B2 | 6/2015 | Sutardja et al. | |
| 9,072,149 B2 | 6/2015 | Wu et al. | |
| 9,125,271 B2 | 9/2015 | Martins et al. | |
| 9,144,131 B2 | 9/2015 | Wray | |
| 9,210,760 B2 | 12/2015 | Sanders et al. | |
| 9,277,607 B2 | 3/2016 | Ramer et al. | |
| 9,289,269 B2 | 3/2016 | Valteau et al. | |
| 9,301,359 B2 | 3/2016 | Wray | |
| 9,374,876 B2 | 6/2016 | Alpert et al. | |
| 9,386,653 B2 | 7/2016 | Kuo et al. | |
| 9,414,457 B2 | 8/2016 | Fukuda et al. | |
| 9,485,826 B2 | 11/2016 | Bohler et al. | |
| 9,538,603 B2 | 1/2017 | Shearer et al. | |
| 9,538,604 B2 | 1/2017 | Yadav et al. | |
| 9,544,951 B1 | 1/2017 | O'Neil et al. | |
| 9,544,969 B2 | 1/2017 | Baddela et al. | |
| 9,554,441 B2 | 1/2017 | Sutardja et al. | |
| 9,560,710 B2 | 1/2017 | Beijer et al. | |
| 9,603,213 B1 | 3/2017 | Suttles et al. | |
| 9,665,262 B2 * | 5/2017 | Hole | G06F 3/0483 |
| 9,719,642 B1 | 8/2017 | Macias | |
| 9,730,291 B1 | 8/2017 | Janik et al. | |
| 9,801,250 B1 | 10/2017 | Halliwell | |
| 9,820,350 B2 | 11/2017 | Pyshos et al. | |
| 9,892,693 B1 | 2/2018 | Kumar et al. | |
| 9,900,945 B1 | 2/2018 | Janik et al. | |
| 10,091,855 B2 | 10/2018 | Van Winkle | |
| 10,117,300 B2 | 10/2018 | Doheny et al. | |
| 10,163,405 B2 | 12/2018 | Kumar et al. | |
| 10,290,265 B2 | 5/2019 | Kumar et al. | |
| 10,292,233 B1 | 5/2019 | Udavant et al. | |
| 10,299,335 B2 | 5/2019 | Pyshos et al. | |
| 10,299,336 B2 | 5/2019 | Bowen et al. | |
| 10,299,337 B1 | 5/2019 | Chen et al. | |
| 10,448,471 B1 | 10/2019 | Chowdhury et al. | |
| 10,575,380 B2 * | 2/2020 | Udavant | F21V 7/00 |
| 10,660,174 B2 * | 5/2020 | Huang | H05B 45/395 |
| 10,674,579 B2 | 6/2020 | Bruckner et al. | |
| 10,681,784 B2 | 6/2020 | Bruckner et al. | |
| 10,856,384 B2 | 12/2020 | Chen et al. | |
| 10,874,006 B1 | 12/2020 | Davis et al. | |
| 10,904,970 B2 * | 1/2021 | Udavant | F21V 3/02 |
| 2005/0162851 A1 | 7/2005 | Kazar et al. | |
| 2005/0243022 A1 | 11/2005 | Negru | |
| 2006/0220586 A1 | 10/2006 | Latham | |
| 2006/0226795 A1 | 10/2006 | Walter et al. | |
| 2006/0238136 A1 | 10/2006 | Johnson, III et al. | |
| 2006/0285310 A1 | 12/2006 | Shyu | |
| 2007/0159750 A1 | 7/2007 | Peker et al. | |
| 2007/0262724 A1 | 11/2007 | Mednik et al. | |
| 2008/0130298 A1 | 6/2008 | Negley et al. | |
| 2009/0026913 A1 | 1/2009 | Mrakovich | |
| 2009/0218960 A1 | 9/2009 | Lyons et al. | |
| 2009/0256483 A1 | 10/2009 | Gehman et al. | |
| 2010/0141175 A1 | 6/2010 | Hasnain et al. | |
| 2010/0171633 A1 | 7/2010 | Baker et al. | |
| 2010/0207534 A1 | 8/2010 | Dowling et al. | |
| 2010/0214764 A1 | 8/2010 | Chaves et al. | |
| 2010/0283322 A1 | 11/2010 | Wibben | |
| 2010/0308738 A1 | 12/2010 | Shteynberg et al. | |
| 2011/0058372 A1 | 3/2011 | Lerman et al. | |
| 2011/0062872 A1 | 3/2011 | Jin et al. | |
| 2011/0068702 A1 | 3/2011 | van de Ven et al. | |
| 2011/0084615 A1 | 4/2011 | Welten | |
| 2011/0115407 A1 | 5/2011 | Wibben et al. | |
| 2011/0210678 A1 | 9/2011 | Grajcar | |
| 2011/0316441 A1 | 12/2011 | Huynh | |
| 2012/0080944 A1 | 4/2012 | Recker et al. | |
| 2012/0081009 A1 | 4/2012 | Shteynberg et al. | |
| 2012/0098460 A1 | 4/2012 | Miyasaka et al. | |
| 2012/0242247 A1 | 9/2012 | Hartmann et al. | |
| 2012/0253542 A1 | 10/2012 | Nurmi et al. | |
| 2012/0286753 A1 | 11/2012 | Zhong et al. | |
| 2013/0002167 A1 | 1/2013 | Van de Ven | |
| 2013/0021580 A1 | 1/2013 | Morgan et al. | |
| 2013/0038222 A1 | 2/2013 | Yeh et al. | |
| 2013/0049610 A1 | 2/2013 | Chen | |
| 2013/0082616 A1 | 4/2013 | Bradford et al. | |
| 2013/0140988 A1 | 6/2013 | Maxik et al. | |
| 2013/0141013 A1 | 6/2013 | Kodama et al. | |
| 2013/0169158 A1 | 7/2013 | He et al. | |
| 2013/0200806 A1 | 8/2013 | Chobot | |
| 2013/0229125 A1 | 9/2013 | Yan et al. | |
| 2013/0249422 A1 | 9/2013 | Kerstens et al. | |
| 2013/0249440 A1 | 9/2013 | Doshi et al. | |
| 2013/0343052 A1 | 12/2013 | Yen | |
| 2014/0001959 A1 | 1/2014 | Motley et al. | |
| 2014/0035472 A1 | 2/2014 | Raj et al. | |
| 2014/0042920 A1 | 2/2014 | Chou | |
| 2014/0184076 A1 | 7/2014 | Murphy | |
| 2014/0197750 A1 | 7/2014 | Cash | |
| 2014/0210357 A1 | 7/2014 | Yan et al. | |
| 2014/0210364 A1 | 7/2014 | Cash et al. | |
| 2014/0252967 A1 | 9/2014 | Van de Ven et al. | |
| 2014/0312777 A1 | 10/2014 | Shearer et al. | |
| 2015/0009666 A1 | 1/2015 | Keng et al. | |
| 2015/0097489 A1 | 4/2015 | Wu et al. | |
| 2015/0245441 A1 | 8/2015 | McCune, Jr. | |
| 2015/0351169 A1 | 12/2015 | Pope et al. | |
| 2015/0359061 A1 | 12/2015 | Adler | |
| 2016/0007420 A1 | 1/2016 | Gong et al. | |
| 2016/0128155 A1 | 5/2016 | Petluri et al. | |
| 2016/0323949 A1 | 11/2016 | Lee | |
| 2016/0363308 A1 | 12/2016 | Shum | |
| 2016/0366746 A1 | 12/2016 | Van de Ven et al. | |
| 2016/0374177 A1 | 12/2016 | Chen | |
| 2017/0019973 A1 | 1/2017 | Beck et al. | |
| 2017/0027033 A1 | 1/2017 | Chobot et al. | |
| 2017/0086265 A1 | 3/2017 | Akiyama et al. | |
| 2017/0086280 A1 | 3/2017 | Boomgaarden et al. | |
| 2017/0135186 A1 | 5/2017 | O'Neil et al. | |
| 2017/0164440 A1 | 6/2017 | Hu et al. | |
| 2017/0238392 A1 | 8/2017 | Shearer et al. | |
| 2018/0035510 A1 | 2/2018 | Doheny et al. | |

(56) References Cited

U.S. PATENT DOCUMENTS

| | | |
|---|---|---|
| 2018/0103523 A1 | 4/2018 | Yan et al. |
| 2018/0116029 A1 | 4/2018 | Pyshos et al. |
| 2018/0166026 A1 | 6/2018 | Kumar et al. |
| 2018/0242422 A1 | 8/2018 | Choi et al. |
| 2018/0249547 A1 | 8/2018 | Wang et al. |
| 2018/0310381 A1 | 10/2018 | Bowen et al. |
| 2018/0368232 A1 | 12/2018 | Doheny et al. |
| 2019/0027099 A1 | 1/2019 | Kumar et al. |
| 2019/0037663 A1 | 1/2019 | Van Winkle |
| 2019/0088213 A1 | 3/2019 | Kumar et al. |
| 2019/0141812 A1 | 5/2019 | Chen |
| 2019/0191512 A1 | 6/2019 | Zeng et al. |
| 2019/0268984 A1 | 8/2019 | Song et al. |
| 2019/0268991 A1 | 8/2019 | Li |
| 2019/0394851 A1 | 12/2019 | Sinphay |

FOREIGN PATENT DOCUMENTS

| | | |
|---|---|---|
| EP | 2728972 | 8/2015 |
| JP | 2011258517 | 12/2011 |
| WO | 2011084135 | 7/2011 |

OTHER PUBLICATIONS

"38W LED Panel—Color Selectable", Venture Lighting, Available Online at: https://www.venturelighting.com/led-lighting/indoor-lighting-fixtures/panels-and-troffers/color-selectable-panels/standard-product/pn38592.html, Accessed from Internet on May 14, 2019, 6 pages.
"EASY Lighting Control", Application Guide, OSRAM, Available Online at: www.osram.com/easy, Apr. 2015, 25 pages.
"Human Centric Lighting", Helvar, Intelligent Colour Product Series, Available Online at: helvar.com/second-sun, Dec. 4, 2017, 4 pages.
"iW Cove MX Powercore-Premium Interior Linear LED Cove and Accent Luminaire with Intelligent White Light", Philips Lighting, Product Family Leafelet, Jan. 21, 2019, 3 pages.
"LED Panel 1230 40W Colour Changeable", Fuzion Lighting, Information sheet, Available online at: http://www.fuzionlighting.com.au/product/led-panel-40-cct, Accessed from Internet on Mar. 19, 2019, 6 pages.
"LED Universal Ceiling Fan Light Kit", Hampton Bay, Use and Care Guide, Nov. 7, 2019, 22 pages.
"LLP LED Light Panel", Main Place Lighting, Specification Sheet, Available Online at: https://cdn.shopify.com/s/files/1/2048/2207/files/LLP-Specification-Sheet-1.pdf, Accessed from Internet on Mar. 19, 2019, 4 pages.
"Noble Pro LED Line Voltage Task Lighting NLLP Series", AFX, Available Online at: www.AFXinc.com, Accessed from Internet at May 13, 2019, 1 page.
"Par Lite Led", VanWhite, Coemar, User Manual Version 1.0, Jun. 2011, 19 pages.
"ViaCon LED—Products", Trilux Simplify your Light, Available Online at: https://www.trilux.com/en/products/viacon-led/, Accessed from Internet on May 13, 2019, 11 pages.
"Warmdim® & Tunable White Adjustable/downlight/wall Wash 1000 Lumen Led 3" Baffle Down Light Trim AX3 WDTW with 3DBAF Trim", Aculux Luminaire, Mar. 20, 2019, 3 pages.
6" IC LED Retrofit Warmdim (TM) Downlight Trim, Juno, Oct. 2012, 2 pages.
Biery et al., Controlling LEDs, Lutron Electronics Corporation Incorporated, May 2014, 20 pages.
Sun, Challenges and Opportunities for High Power White LED Development, DOE SSL R&D Workshop, Feb. 1, 2012, pp. 1-12.

* cited by examiner

SYSTEMS TO CONTROL LIGHT OUTPUT CHARACTERISTICS OF A LIGHTING DEVICE

TECHNICAL FIELD

This disclosure relates generally to systems to control light output of a lighting device. More specifically, but not by way of limitation, this disclosure relates to light-emitting diode light fixture systems providing control of intensity and color output of a lighting device.

BACKGROUND

Light fixture lighting output control operations provide a mechanism for adjusting a brightness and color temperature of a light output on gradients from a bright output to a dim output (or from a dim output to a bright output), from one color temperature to another color temperature, or a combination thereof. Dimming operations and color temperature changing operations of the LED light fixtures may be performed using separate control mechanisms. Because the dimming operations and color temperature changing operations are performed using separate control mechanisms, added costs may be present in the light fixture associated with the additional control mechanism, and a heightened mechanical complexity of the light fixture may also be associated with the additional control mechanism.

SUMMARY

Certain aspects involve lighting systems in which the color temperature and the intensity of the illumination can be selectively modified. For instance, a lighting system includes a lighting device. The lighting device includes a first group of light-emitting diodes that output a first light output with a first correlated color temperature and a second group of light-emitting diodes that output a second light output with a second correlated color temperature. The lighting system also includes a driver that drives the first light output of the first group of light-emitting diodes and the second light output of the second group of light-emitting diodes. Further, the lighting system includes an input device. The input device includes a first selector element communicatively coupled to the driver across a power cable that provides a transmission path of power and a control signal between the input device and the driver. The first selector element controls a lumen output of the lighting device when in a lumen control mode and controls a correlated color temperature of the lighting device when in a correlated color temperature control mode. Additionally, the input device includes a second selector element that transitions the first selector element between the lumen control mode and the correlated color temperature control mode.

In an additional example, an input device of the lighting system includes a first selector element communicatively coupled to a driver of a light-emitting diode lighting device across a power cable. The power cable provides a transmission path of power and a control signal between the input device and the driver of the light-emitting diode lighting device. The first selector element is able to control a lumen output of the light-emitting diode lighting device when in a lumen control mode and to control a correlated color temperature output of the light-emitting diode lighting device when in a correlated color temperature control mode. The input device also includes a second selector element that transitions the first selector element between the lumen control mode and the correlated color temperature control mode.

In an additional example, a method includes receiving a first selection from a switching device of an input device to transition from a correlated color temperature control mode to a lumen control mode. The method also includes receiving a first input from a control disc of the input device to adjust a lumen output of a light-emitting diode lighting device and controlling the lumen output of the light-emitting diode lighting device using the first input from the control disc. Additionally, the method includes receiving a second selection from the switching device to transition from the lumen control mode to the correlated color temperature control mode. Further, the method includes receiving a second input from the control disc of the input device to adjust a correlated color temperature output of the light-emitting diode lighting device and controlling the correlated color temperature output of the light-emitting diode lighting device using the second input from the control disc.

These illustrative aspects are mentioned not to limit or define the disclosure, but to provide examples to aid understanding thereof. Additional aspects are discussed in the Detailed Description, and further description is provided there.

BRIEF DESCRIPTION OF THE DRAWINGS

Features, aspects, and advantages of the present disclosure are better understood when the following Detailed Description is read with reference to the accompanying drawings.

DETAILED DESCRIPTION

The present disclosure relates to systems that control light intensity and color temperature operations of a light-emitting diode (LED) light fixture. As explained above, control of light intensity operations of LED light fixtures is generally performed using a separate control mechanism from control of color temperature operations of LED light fixtures. As a result, the light fixture may include a complex set of control mechanisms to control various light characteristics of the light fixture. Certain aspects described herein improve the operation of the intensity and color temperature control of LED light fixtures. For example, certain aspects involve a mechanism that can switch between light intensity control and color temperature control using the same control mechanism.

To provide a mechanism that enables the transitioning of control between light intensity control and color temperature control, multiple LED strings of varying color temperatures may be positioned within the LED light fixture. In an example, one or more yellow, amber, white, or LED strings with other color temperatures are activated or deactivated during a color temperature control operation to provide varying a light outputs by the LED light fixture. A selector in communication with the LED light fixture may transition a control mechanism of the LED light fixture from the color temperature control to light intensity control. For example, the selector in one position or state enables a control mechanism to control a light output color temperature of the LED fixture, and the selector in another position or state enables the control mechanism to control a light intensity output of the LED fixture.

Figure 1:
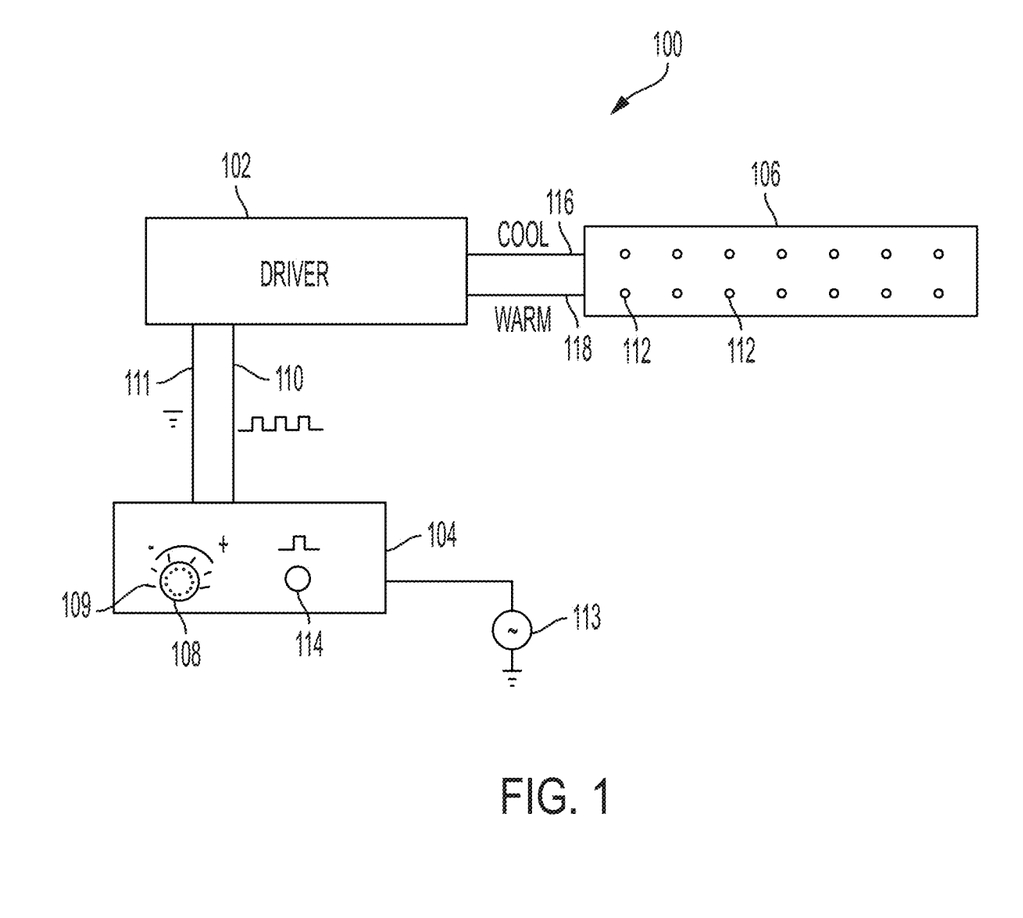
FIG. 1 depicts a block diagram of an example of a light system with a two-channel driver, according to certain aspects of the present disclosure.

FIG. 1 is a block diagram depicting an example of a light system 100 with a two-channel driver 102, according to certain aspects of the present disclosure. The illustrated light system 100 also includes an input device 104 and a two-color temperature lighting device 106. In an example, the input device 104 includes a control disc 108 (e.g., a first selector element) that is capable of operating as a dimmer wheel to control light intensity of the lighting device 106 (e.g., an LED light fixture) based on user input. In an example, the control disc 108 may be a continuous rotation potentiometer, a continuous rotation sensor, a rotary encoder, an optical encoder, or any other device capable of generating an output representative of an increase or a decrease in a desired light intensity of the lighting device 106. The input device 104 deciphers a rotational direction of the control disc 108 (e.g., clockwise or counter-clockwise) based on a signal output from the control disc 108.

In an example, the input device 104 includes a set of detents 109 positioned around the control disc 108. The detents 109 may interact mechanically with an extension of the control disc 108 to provide an audible or vibrational feedback to a user as the extension of the control disc 108 rotates through the detents 109. By providing the user with feedback about the rotation of the control disc 108, the user may be able to track a magnitude of the rotation of the control disc 108.

Based on the detected rotation direction, the input device 104 provides power and serial communication signals to the driver 102 along a power cable 110. For example, the input device 104 may inject a control signal on the power cable 110 (e.g., using powerline communications) that indicates a requested increase or a decrease in lumen output of the lighting device 106. A ground cable 111 may complete a circuit between the input device 104 and the driver 102.

In an example, the driver 102 decodes the injected control signal and drives the lighting device 106 to a new lumen output. For example, the driver 102 may increase or decrease a duty cycle used to control light-emitting diodes (LEDs) 112 arranged on the lighting device 106. By increasing the duty cycle of the LEDs 112, the lumen output increases. Similarly, by decreasing the duty cycle of the LEDs 112, the lumen output decreases. In another example, the driver 102 may increase or decrease a constant current applied to the lighting device 106 to control the lumen output of the LEDs 112.

A switching device 114 (e.g., a second selector element), which may be a push-button switch, a toggle switch, or any other suitable switching device, may switch the control disc 108 between a lumen control mode, as discussed above, and a correlated color temperature (CCT) control mode. For example, when the switching device 114 is pushed or toggled, the input device 104 may transition from the lumen control mode to the CCT control mode. While in the CCT control mode, the control disc 108 may control a color temperature of the light output of the lighting device 106. In an example, the input device 104 may be positioned on a wall of a room or a building in place of a light switch associated with the lighting device 106. Other locations of the input device 104 are also contemplated where a user is able to access the input device 104 to interact with the control disc 108 and the switching device 114. In some examples, the input device 104 may be located within a light fixture such that the control disc 108 and the switching device 114 are controlled by a user prior to installation of the light fixture within or on a ceiling or wall.

Based on the detected rotation direction of the control disc 108, the input device 104 provides power and serial communication signals to the driver 102 along the power cable 110. For example, the input device 104 may inject a control signal on the power cable 110, where the control signal briefly sinks a voltage on the power cable 110 in rapid succession to form a serial data stream that can be decoded by the driver 102 to indicate a requested change to the color temperature of the lighting device 106. A ground cable 111 may complete a circuit between the input device 104 and the driver 102. In an example, the input device 104 may receive power from a power source 113 (e.g., mains power). Power from the power source 113 may be provided to the driver 102 across the power cable 110 to power the lighting device 106. While the power source 113 is shown as an AC source, a DC source, such as a battery, may also be used to provide power to the input device 104.

In an example, the driver 102 decodes the injected control signal and drives the lighting device 106 to a new color temperature. For example, the driver 102 may increase or decrease a duty cycle applied to a cool driver line 116, a warm driver line 118, or a combination of the cool driver line 116 and the warm driver line 118. In an example, the cool driver line 116 drives a group of light-emitting diodes (LEDs) 112 that collectively emit a cool color temperature, and the warm driver line 118 drives a group of LEDs 112 that collectively emit a warm color temperature. The duty cycles provided on the cool driver line 116 and the warm driver line 118 are used to control the LEDs 112 arranged on the lighting device 106. By increasing or decreasing the duty cycle of the LEDs 112 controlled by the cool driver line 116 (e.g., LEDs 112 with a color temperature range between 5000 and 6500 Kelvin), the coolness of the light output is increased or decreased. Similarly, By increasing or decreasing the duty cycle of the LEDs 112 controlled by the warm driver line 118 (e.g., LEDs 112 with a color temperature range between 1800 and 4000 Kelvin), the warmth of the light output is increased or decreased. In another arrangement, the driver 102 may increase or decrease a constant current applied to the lighting device 106 over the cool driver line 116 and the warm driver line 118 to control the correlated color temperature of the light output of the LEDs 112.

Additionally, the driver 102 may maintain a light intensity of the light output of the lighting device 106 while adjusting the correlated color temperature of the light output of the lighting device 106. For example, PWM signals on both the cool driver line 116 and the warm driver line 118 may be adjusted while the correlated color temperature changes such that the overall light intensity of the lighting device 106 remains constant. Further, the driver 102 may maintain the correlated color temperature of the light output of the lighting device 106 while adjusting the light intensity of the light output of the lighting device 106. For example, the PWM signals on the cool driver line 116 and the warm driver line 118 may maintain a constant duty cycle ratio. That is, if the duty cycle of the cool driver line 116 is 20% and the duty cycle of the warm driver line 118 is 10%, the duty cycle of the cool driver line 116 may be maintained as twice the duty cycle of the warm driver line 118 as the light intensity of the light output increases or decreases.

In an additional example, the switching device 114 may be used to control the correlated color temperature of the light output of the LEDs 112 while the control disc 108 separately controls the intensity of the light output. For example, the switching device 114 may cycle through a predetermined set of correlated color temperatures when the switching device 114 is activated. In one example, the switching device may cycle through correlated color temperatures of 2700, 3000, 3500, 4000, and 5000 degrees Kelvin. More or fewer correlated color temperatures may also be used, and different values of the correlated color temperatures may be used.

In a similar manner, the switching device 114 may be used to control the intensity of the light output of the LEDs 112 while the control disc 108 separately controls the correlated color temperature of the light output. For example, the switching device 114 may cycle through a predetermined set of light intensities when the switching device 114 is activated. In one example, the switching device may cycle through five different light intensity settings. More or fewer light intensity settings may also be used.

In some examples, the input device 104 and the driver 102 may include a bidirectional communication scheme across the single power cable 110. For example, the driver 102 may act as a master device capable of synchronizing communication across the power cable 110. Upon the light system 100 powering on, the driver 102 may send a communication signal to the input device 104 to initialize the communication between the driver 102 and the input device 104. Once the input device 104 detects the driver 102, the input device 104 can respond back to the driver 102 indicating the capabilities of the input device 104. In an example, the driver 102 may establish time windows for communication between the driver 102 and the device 104. For example, the driver 102 may be able to send communications to the input device 104 for 10 ms, and the input device 104 may be able to send communications to the driver 102 for the following 10 ms. Other communication time windows may also be established. In this manner, the communications between the two devices can avoid overlap across the power cable 110.

In another example, the driver 102 may establish separate communication frequencies for bidirectional communication. For example, the driver 102 may communicate over the power cable 110 using a first communication frequency and the input device 104 may communicate over the power cable 110 using a second communication frequency. Further, in some examples, the input device 104 may function as the master device to synchronize communications either by establishing the communication time windows or by establishing the communication frequencies.

In some examples, the driver 102 or the input device 104 may store a most recent setting (e.g., intensity and color temperature) of the lighting device 106 in a memory device (not shown) when the lighting device 106 transitions to an off state. When the lighting device 106 is powered back on, the driver 102 may control the lighting device 106 to the most recent setting of the lighting device 106 stored in the memory device.

Figure 2:
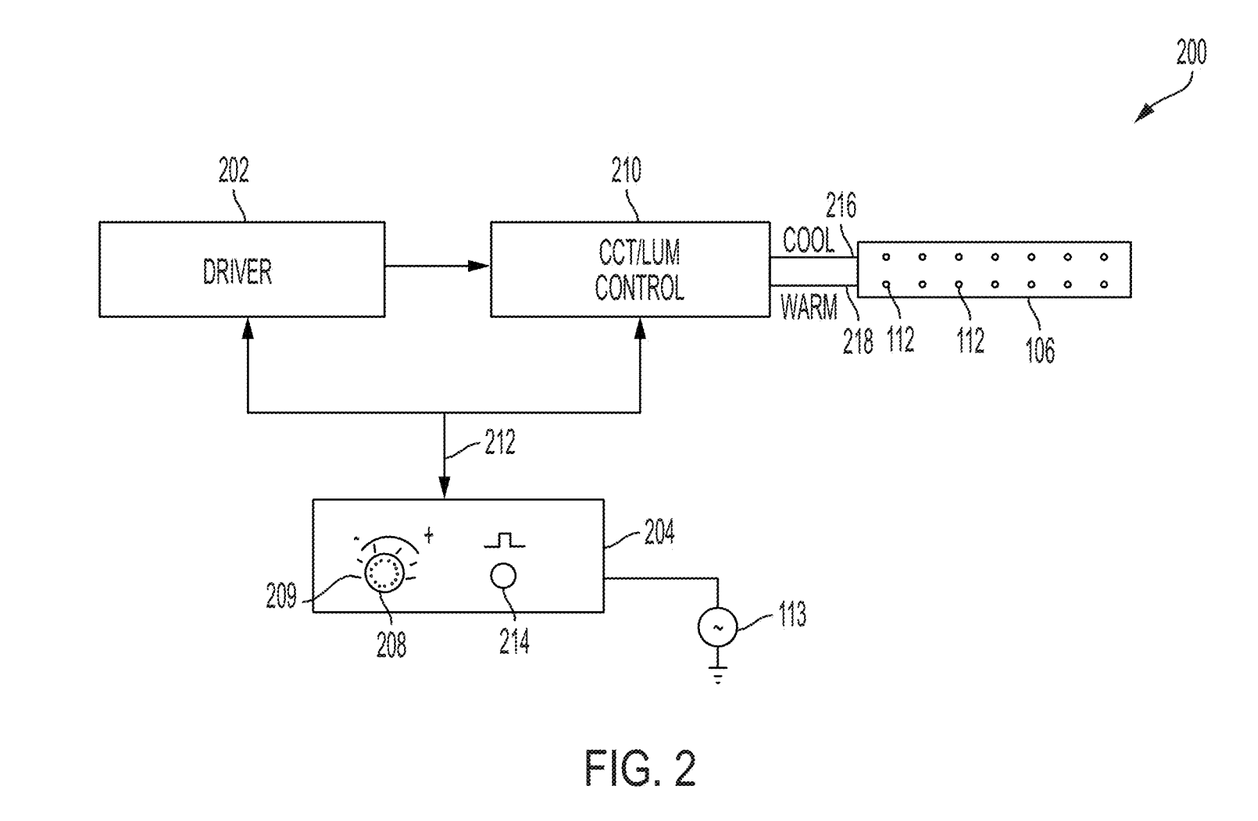
FIG. 2 depicts a block diagram of an example of a light system with a single-channel driver, according to certain aspects of the present disclosure.

FIG. 2 is a block diagram of an example of a light system 200 with a single-channel driver 202, according to certain aspects of the present disclosure. The illustrated light system 200 also includes an input device 204 and the two-color temperature lighting device 106. In an example, the input device 204 includes a control disc 208 that is capable of operating as a dimmer wheel to control light intensity of the lighting device 106 based on user input. The control disc 208 may be a continuous rotation potentiometer, a continuous rotation sensor, a rotary encoder, an optical encoder, or any other device capable of generating an output representative of an increase or a decrease in a desired light intensity of the lighting device 106. The input device 204 deciphers a rotational direction of the control disc 208 (e.g., clockwise or counter-clockwise) based on a signal output from the control disc 208.

In an example, the input device 204 includes a set of detents 209 positioned around the control disc 208. The detents 209 may interact mechanically with an extension of the control disc 208 to provide an audible or vibrational feedback to a user as the extension of the control disc 208 rotates through the detents 209. By providing the user with feedback about the rotation of the control disc 208, the user may be able to track a magnitude of the rotation of the control disc 208.

Based on the detected rotation direction, the input device 204 provides power and serial communication signals to the driver 202 and a light controller 210 along a power cable 212. For example, the input device 204 may inject a control signal onto the power cable 212 that indicates a requested increase or a decrease in the lumen output or the correlated color temperature of the lighting device 106. In an example, the input device 204 may receive power from the power source 113 (e.g., mains power). Power from the power source 113 may be provided to the driver 202 across the power cable 212 to power the lighting device 106. While the power source 113 is shown as an AC source, a DC source, such as a battery, may also be used to provide power to the input device 204.

In an example, the driver 202 decodes the injected control signal providing instructions to change a light intensity output of the lighting device 106 to a new lumen output. For example, the driver 202 may increase or decrease a duty cycle used to control LEDs 112 arranged on the lighting device 106. By increasing the duty cycle of the LEDs 112, the lumen output increases. Similarly, by decreasing the duty cycle of the LEDs 112, the lumen output decreases. Changes in correlated color temperature (CCT) are controlled by the light controller 210. For example, the light controller 210 receives power from the driver 202 and divides the power into separate light engines of the lighting device 106 to change the CCT of the lighting device 106. Power from the driver 202 is distributed to the lighting device 106 according to the instructions sent by the input device 204 to affect the brightness of the LED 112.

A switching device 214, which may be a push-button switch, a toggle switch, or any other suitable switching device, may switch the control disc 208 between a lumen control mode, as discussed above, and a CCT control mode. For example, when the switching device 214 is pushed or toggled, the input device 204 may transition from the lumen control mode to the CCT control mode. While in the CCT control mode, the control disc 208 may control color temperature of the light output of the lighting device 106.

Based on the detected rotation direction of the control disc 208, the input device 204 provides power and serial communication signals to the light controller 210 along the power cable 212. For example, the input device 204 may inject a control signal onto the power cable 212 that indicates a requested change to the color temperature of the lighting device 106.

In an example, the light controller 210 decodes the serial signal from the power and cable 212 and controls a light output of the lighting device 106 to a new color temperature. For example, the light controller 210 may increase or decrease a duty cycle applied to a cool driver line 216, a warm driver line 218, or a combination of the cool driver line 216 and the warm driver line 218. The duty cycles provided on the cool driver line 216 and the warm driver line 218 are used to control light-emitting diodes (LEDs) 112 arranged on the lighting device 106. By increasing or decreasing the duty cycle of the LEDs 112 controlled by the cool driver line 216 (e.g., LEDs 112 with a white color temperature), the coolness of the light output is increased or decreased respectively. Similarly, By increasing or decreasing the duty cycle of the LEDs 112 controlled by the warm driver line 218 (e.g., LEDs with a yellow or amber color temperature), the warmth of the light output is increased or decreased respectively. Power applied to the cool driver line 216 and the warm driver line 218 may be received from the driver 202, which converts the power to an appropriate level to drive the LEDs 112.

In an additional example, the switching device 214 may be used to control the correlated color temperature of the light output of the lighting device 106, while the control disc 208 separately controls the intensity of the light output of the lighting device 106. For example, each activation of the switching device 214 (e.g., pressing in a push-button or flipping a switch) may result in cycling through a predetermined set of correlated color temperatures when the switching device 214 is activated. In one example, the switching device may cycle through correlated color temperatures of 2700, 3000, 3500, 4000, and 5000 Kelvin. More or fewer correlated color temperatures may also be used, and different values of the correlated color temperatures may be used.

In a similar manner, the switching device 214 may be used to control the intensity of the light output of the lighting device 106, while the control disc 208 separately controls the correlated color temperature of the light output of the lighting device 106. For example, the switching device 214 may cycle through a predetermined set of light intensities when the switching device 214 is activated. In one example, the switching device 214 may cycle through five different light intensity settings. More or fewer light intensity settings may also be used.

The driver 202 and the light controller 210 may each be designed to react to specific types of control signals provided across the power cable 212. For example, the driver 202 may only react to intensity control commands, and the light controller 210 may only react to color temperature control commands. In an example, the control signals may have a component (e.g., a bit) that identifies the control signal as an intensity control command or a color temperature control command. In this manner, the driver 202 and the light controller 210 each control separate functions of the lighting device 106.

In some examples, the input device 204, the driver 202, and the light controller 210 may include a multi-directional communication scheme across the power cable 212. For example, the driver 202 may act as a master device capable of synchronizing communication across the power cable 212. Upon the light system 200 powering on, the driver 202 may send a communication signal to the input device 204 and the light controller 210 to initialize the communication between the driver 202, the input device 204, and the light controller 210. In an example, the driver 202 may establish time windows for communication between the driver 202, the input device 204, and the lighting controller 210. For example, the driver 202 may be able to send communications to the input device 204 and the lighting controller 210 for 10 ms, the input device 104 may be able to send communications to the driver 202 and the lighting controller 210 for the following 10 ms, and the lighting controller 210 may be able to send communications to the driver 202 and the input device 102 for the subsequent 10 ms. This cycle may be repeated until the light system 200 transitions to an 'off' state. Other communication time windows may also be established. In this manner, the communications between the three devices can avoid overlap across the power cable 212.

In another example, the driver 202 may establish separate communication frequencies for simultaneous communication between the devices. For example, the driver 202 may communicate over the power cable 212 using a first communication frequency, the input device 204 may communicate over the power cable 212 using a second communication frequency, and the lighting controller 210 may communicate over the power cable 212 using a third communication frequency. Further, in some examples, the input device 204 or the lighting controller 210 may function as the master device to synchronize communications either by establishing the communication time windows or by establishing the communication frequencies.

Figure 3:
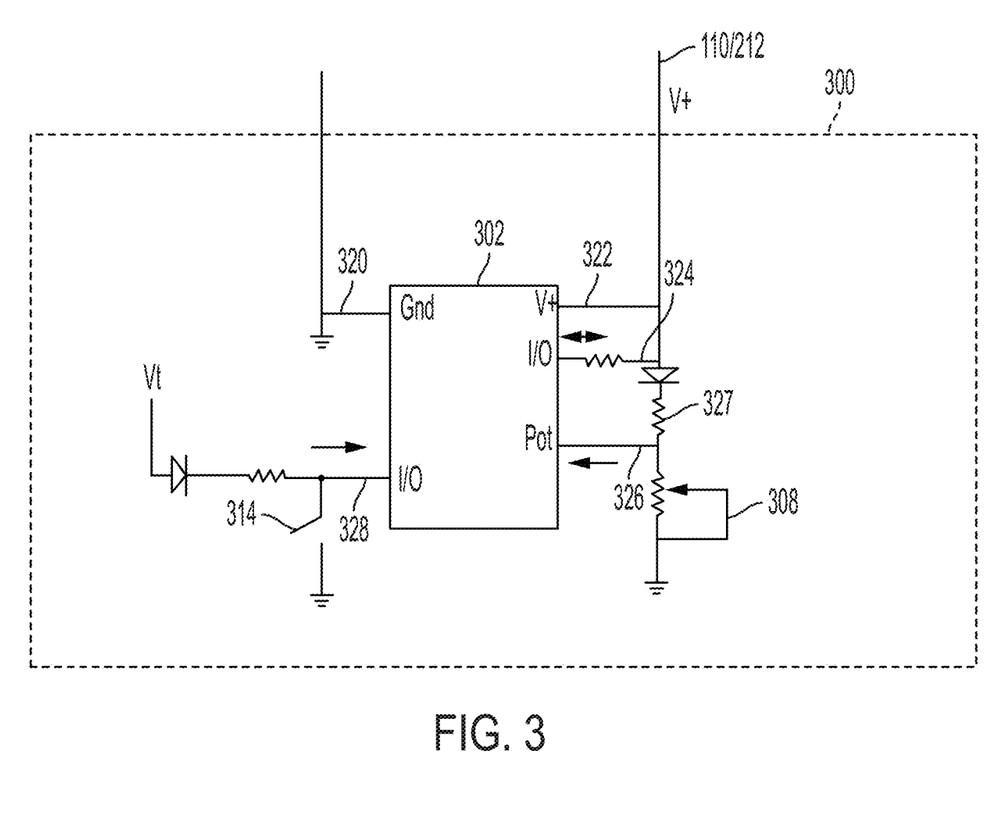
FIG. 3 depicts a schematic diagram of an input device of the light systems of FIGS. 1 and 2, according to certain aspects of the present disclosure.

FIG. 3 depicts a schematic diagram of an example input device 300 (e.g., the input devices 104 and 204) of the light systems 100 and 200, according to certain aspects of the present disclosure. The input device 300 includes a microprocessor 302, a two-state switching device 314 (e.g., the switching device 114 or 214), and a potentiometer 308 (e.g., the control disc 108 or 208). While the input device 300 includes the potentiometer 308, other control discs, such as optical encoders, may be used in place of the potentiometer 308.

The microprocessor 302 includes a ground port 320 and a power port 322 that are coupled to the driver 102, as depicted in FIG. 1, or the driver 202 and lighting controller 210, as depicted in FIG. 2. The power port 322 provides a power input to the lighting device 106 across the power cable 110 or 212. For example, the power port 322 provides the power input from the power source 113 to the driver 102 or 202 of the lighting device 106 using the power cable 110 or 212. An input/output port 324 may inject a communication signal onto the power cable 110 or 212 that provides power to the lighting device 106. The communication signal injected onto the power signal may provide instructions that are useable by the driver 102 or 202, the lighting controller 210, or a combination thereof to control a light output of the lighting device 106. For example, the instructions may be provided to adjust a light output intensity of the lighting device 106, to adjust a correlated color temperature of the lighting device 106, or to adjust the light output intensity and the correlated color temperature of the lighting device 106. Additionally, the driver 102 or 202, the lighting controller 210, or both may also inject communication signals (e.g., a light initialization update; communication timing instructions; light status updates; malfunction codes; power usage levels; run-time timers; daylight simulators, such as a cool CCT in the morning, a very cool CCT at noon, a warm CCT in the afternoon, a very warm CCT in the evening; etc.) onto the power cable 110 or 212 such that the communication signals are provided to the microcontroller 302.

In an example, the microprocessor 302 also includes a potentiometer port 326. The potentiometer port 326 detects a voltage based on a setting of the potentiometer 308 (e.g., as established by turning the control disc 108 or 208) in relation to a resistance of a resistor 327. The microprocessor may track rotation of the control disc 108 or 208 based on the voltage detected at the potentiometer port 326. By tracking the rotation of the control disc 108 or 208, the microprocessor is able to inject communication signals onto the power cable 110 or 212 at the input/output port 324 to control a light intensity or a correlated color temperature of the light output of the lighting device 106.

The microprocessor 302 also includes an additional input/output port 328. The input/output port 328 receives a signal generated by the switching device 312. For example, the switching device 312 may provide a high signal or a low signal to the input/output port 328 of the microprocessor 302 depending on whether the switching device 312 is open or closed. When the switching device 314 is open, the signal to the input/output port 328 is high. When the switching device 314 is closed, the signal to the input/output port 328 is low.

In some examples, the CCT control mode may be entered when the signal to the input/output port 328 is high, and the lumen control mode may be entered when the signal is low. In additional examples, the CCT control mode may be entered when the signal to the input/output port 328 is low, and the lumen control mode may be entered when the signal is high. In other examples, opening and closing the switching device 314 may indicate that the correlated color temperature or the lumen output of the lighting device 106 should be toggled between a set of pre-determined output levels (e.g., five intensity levels or five correlated color temperature levels). The signal injected from the microprocessor 302 onto the power cable 110 or 212 at the input/output port 324 may change based on the signal generated by the switching device 314. For example, the injected signal may indicate a change in lighting intensity when the switching device 314 is closed, and the injected signal may indicate a change to the correlated color temperature when the switching device 314 is open.

Figure 4:
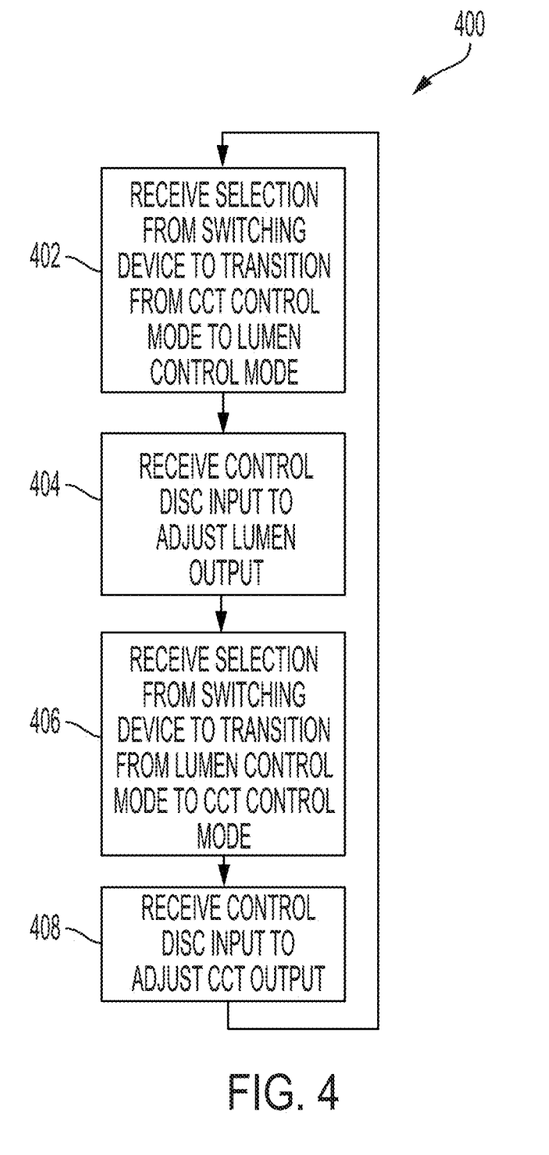
FIG. 4 depicts a flowchart of a process for switching between a correlated color temperature control mode and a lumen control mode of the light systems of FIGS. 1 and 2, according to certain aspects of the present disclosure.

FIG. 4 is a flowchart of a process 400 for switching between the CCT control mode and the lumen control mode of the light systems 100 and 200, according to certain aspects of the present disclosure. At block 402, the process 400 involves receiving a selection from the switching device 314 to transition from the CCT control mode to the lumen control mode. In some examples, the switching device 314 may control whether a high signal or a low signal is provided to the microcontroller 302. The microcontroller 302 may assign the CCT control mode to the high signal and the lumen control mode to the low signal. In another example, the microcontroller 302 may assign the lumen control mode to the high signal and the CCT control mode to the low signal.

At block 404, the process 400 involves receiving a control disc input at the microcontroller 302 to adjust the lumen output of the lighting device 106. The control disc input, which is provided by rotation of the control disc 108, may involve a user rotating the control disc 108 until a desired lumen output is achieved. As the control disc 108 is rotated, the microprocessor 302 provides control signals along the power cable 110 or 212 to the driver 102 or 202. The control signals are decoded by the driver 102 or 202, and the driver 102 or 202 adjusts the lumen output of the lighting device 106 accordingly.

At block 406, the process 400 involves receiving a selection from the switching device 314 to transition the microprocessor 302 from the lumen control mode to the CCT control mode. In an example, the switching device 314 may be switched from an open state to a closed state or from a closed state to an open state for the microprocessor 302 to switch from the lumen control mode to the CCT control mode.

At block 408, the process 400 involves receiving control disc input at the microprocessor 302 to adjust the correlated color temperature output of the lighting device 106. The control disc input, which is provided by rotation of the control disc 108, may involve a user rotating the control disc 108 until a desired correlated color temperature output is achieved. As the control disc 108 is rotated, the microprocessor 302 provides control signals along the power cable 110 or 212 to the driver 102 in the light system 100 or to the lighting controller 210 in the light system 200. The control signals are decoded by the driver 102 or the lighting controller 210, and the driver 102 or the lighting controller 210 adjusts the correlated color temperature output of the lighting device 106 accordingly.

Figure 5:
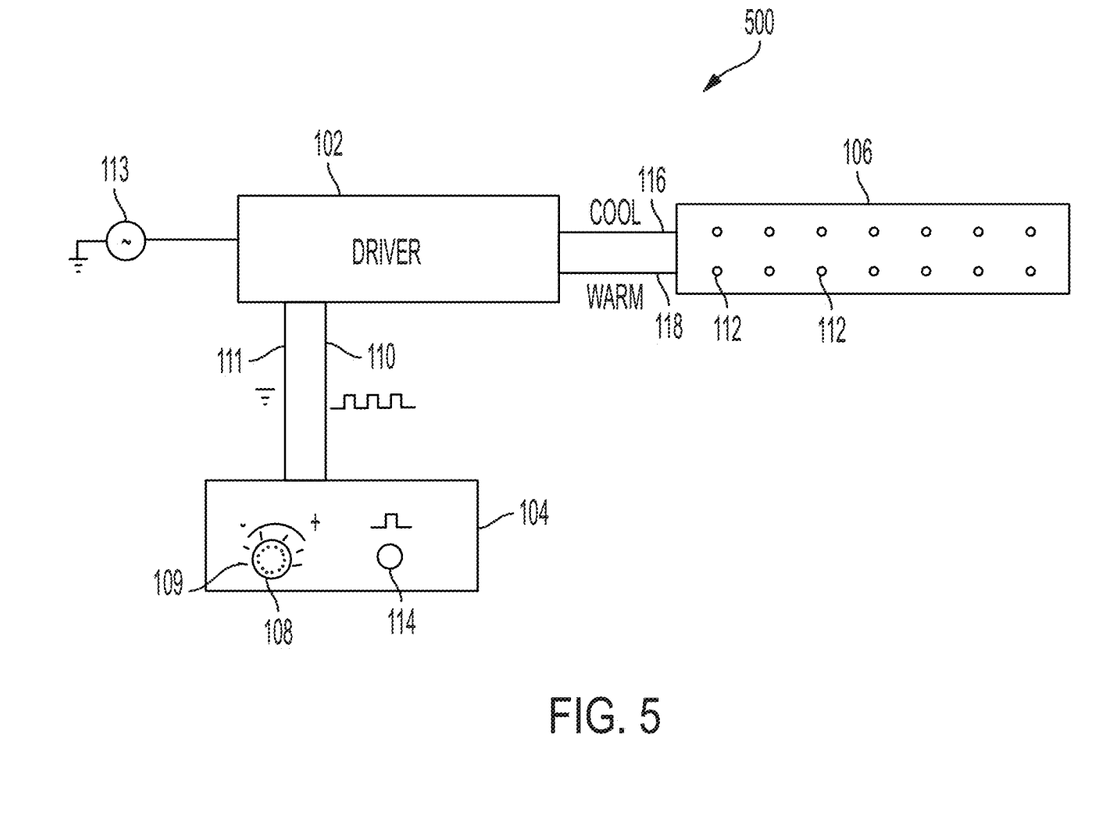
FIG. 5 depicts a block diagram of an additional example of a light system with a two-channel driver, according to certain aspects of the present disclosure.

FIG. 5 depicts a block diagram of an additional example of a light system 500 with the two-channel driver 102, according to certain aspects of the present disclosure. The light system 500 includes components similar to the light system 100 of FIG. 1. Instead of, the input device 104 providing power to the driver 102 from the power source 113 (e.g., mains power), the driver 102 receives the power from the power source 113 directly. While the power source 113 is shown as an AC source, a DC source, such as a battery, may also be used to provide power to the input device 104.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A lighting system, comprising:
   a lighting device, comprising:
      a first group of light-emitting diodes configured to output a first light output with a first correlated color temperature; and
      a second group of light-emitting diodes configured to output a second light output with a second correlated color temperature;
   a driver configured to drive the first light output of the first group of light-emitting diodes and to drive the second light output of the second group of light-emitting diodes; and
   an input device, comprising:
      a first selector element communicatively coupled to the driver across a power cable that provides a transmission path of power and a control signal between the input device and the driver, wherein the first selector element is configured to control a lumen output of the lighting device when in a lumen control mode and to control a correlated color temperature of the lighting device when in a correlated color temperature control mode; and
      a second selector element configured to transition the first selector element between the lumen control mode and the correlated color temperature control mode.

2. The lighting system of claim 1, further comprising:
   a lighting controller configured to control the correlated color temperature of the lighting device based on the control signal received from the input device over the power cable.

3. The lighting system of claim 1, wherein the first selector element comprises a control disc coupled to a potentiometer or an optical encoder, and wherein the input device injects the control signal onto the power cable using a rotation of the control disc to control the lumen output or the correlated color temperature of the lighting device.

4. The lighting system of claim 3, wherein the control signal injected onto the power cable comprises a serial data stream that is generated by sinking a power signal on the power cable in rapid succession.

5. The lighting system of claim 1, wherein the second selector element comprises a two-state switching device, and wherein the lumen control mode is entered at a first state of the two-state switching device and the correlated color temperature control mode is entered at a second state of the two-state switching device.

6. The lighting system of claim 1, wherein the input device further comprises:
   an input/output port configured to inject the control signal onto the power cable for transmission to the driver and to receive a communication signal from the driver.

7. The lighting system of claim 1, wherein the input device further comprises:
   a microcontroller configured to detect a rotation of the first selector element and to generate the control signal using the detected rotation.

8. The lighting system of claim 7, wherein the microcontroller is further configured to receive communication signals from the driver across the power cable.

9. The lighting system of claim 1, wherein the driver is configured to drive the first group of light-emitting diodes from a first driver line and separately drive the second group of light-emitting diodes from a second driver line.

10. The lighting system of claim 1, wherein the first correlated color temperature comprises a white color temperature, and the second correlated color temperature comprises a yellow color temperature.

11. An input device, comprising:
   a first selector element communicatively coupled to a driver of a light-emitting diode lighting device across a power cable that provides a transmission path of power and a control signal between the input device and the driver, wherein the first selector element is configured to control a lumen output of the light-emitting diode lighting device when in a lumen control mode and to control a correlated color temperature output of the light-emitting diode lighting device when in a correlated color temperature control mode; and
   a second selector element configured to transition the first selector element between the lumen control mode and the correlated color temperature control mode.

12. The input device of claim 11, wherein the first selector element comprises a control disc coupled to a potentiometer or an optical encoder, and wherein the input device injects the control signal onto the power cable using a rotation of the control disc to control the lumen output or the correlated color temperature output of the light-emitting diode lighting device.

13. The input device of claim 12, wherein the control signal injected onto the power cable comprises a serial data stream that is generated by sinking a power signal on the power cable in rapid succession.

14. The input device of claim 11, wherein the second selector element comprises a two-state switching device, and wherein the lumen control mode of the first selector element is assigned to a first state of the two-state switching device and the correlated color temperature control mode is assigned to a second state of the two-state switching device.

15. The input device of claim 11, further comprising:
   an input/output port configured to inject the control signal onto the power cable for transmission to the driver and to receive a communication signal from the driver.

16. The input device of claim 11, wherein the first selector element is communicatively coupled to a lighting controller, and wherein the driver is configured to control the lumen output of the light-emitting diode lighting device and the lighting controller is configured to control the correlated color temperature output of the light-emitting diode lighting device.

17. A method, comprising:
   receiving a first selection from a switching device of an input device to transition from a correlated color temperature control mode to a lumen control mode;
   receiving a first input from a control disc of the input device to adjust a lumen output of a light-emitting diode lighting device;
   controlling the lumen output of the light-emitting diode lighting device using the first input from the control disc;
   receiving a second selection from the switching device to transition from the lumen control mode to the correlated color temperature control mode;
   receiving a second input from the control disc of the input device to adjust a correlated color temperature output of the light-emitting diode lighting device; and
   controlling the correlated color temperature output of the light-emitting diode lighting device using the second input from the control disc.

18. The method of claim 17, further comprising:
   reading a most recent state of the light-emitting diode lighting device at startup of the light-emitting diode lighting device; and
   outputting a light output associated with the most recent state of the light-emitting diode lighting device at the startup of the light-emitting diode lighting device.

19. The method of claim 17, further comprising:
   maintaining the correlated color temperature output of the light-emitting diode lighting device while controlling the lumen output of the light-emitting diode lighting device; and
   maintaining the lumen output of the light-emitting diode lighting device while controlling the correlated color temperature output of the light-emitting diode lighting device.

20. The method of claim 17, wherein controlling the lumen output and the correlated color temperature output comprises injecting a control signal onto a power cable coupled between the input device and a driver of the light-emitting diode lighting device.

* * * * *